United States Patent
Cho et al.

(10) Patent No.: US 10,130,948 B2
(45) Date of Patent: Nov. 20, 2018

(54) MICROFLUIDIC DEVICE AND CONTROL EQUIPMENT FOR MICROFLUIDIC DEVICE

(71) Applicant: UNIST (ULSAN NATIONAL INSTITUTE OF SCIENCE AND TECHNOLOGY), Ulsan (KR)

(72) Inventors: Yoon-Kyoung Cho, Ulsan (KR); Tae-Hyeong Kim, Ulsan (KR); Yu Bin Kim, Ulsan (KR)

(73) Assignee: UNIST (ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 0 days.

(21) Appl. No.: 14/894,364

(22) PCT Filed: Apr. 28, 2015

(86) PCT No.: PCT/KR2015/004249
§ 371 (c)(1),
(2) Date: Nov. 26, 2015

(87) PCT Pub. No.: WO2016/043399
PCT Pub. Date: Mar. 24, 2016

(65) Prior Publication Data
US 2017/0173582 A1    Jun. 22, 2017

(30) Foreign Application Priority Data
Sep. 15, 2014  (KR) .......................... 10-2014-0121909

(51) Int. Cl.
*B01L 3/00*      (2006.01)
*F16K 99/00*    (2006.01)

(52) U.S. Cl.
CPC .... *B01L 3/502738* (2013.01); *F16K 99/0015* (2013.01); *F16K 99/0026* (2013.01);
(Continued)

(58) Field of Classification Search
CPC ....... B01L 2200/143; B01L 2300/0803; B01L 2300/123; B01L 2400/0409;
(Continued)

(56) References Cited

U.S. PATENT DOCUMENTS

| 2003/0172975 A1 | 9/2003 | Gilbert et al. |
| 2010/0116343 A1 | 5/2010 | Weibel |
| 2013/0000758 A1 | 1/2013 | Hoen |

FOREIGN PATENT DOCUMENTS

| CN | 1700018 | 11/2005 |
| JP | 2003-525101 | 8/2003 |

(Continued)

OTHER PUBLICATIONS

Translation of JP 2013-015134 claims (Year: 2013).*
(Continued)

*Primary Examiner* — Samuel P Siefke
(74) *Attorney, Agent, or Firm* — Lex IP Meister, PLLC (57) ABSTRACT

Provided is a microfluidic device to more easily and mechanically operate a valve for controlling a fluid flow, which comprises: a platform having a plurality of chambers; at least one flow channel which connects between the chambers; and a valve which opens or closes the flow channel, wherein the valve includes a blocking member which selectively blocks the flow channel and a pressing member installed in the blocking member to move the blocking member, and the pressing member has a structure which presses and moves the blocking member by the linear reciprocating motion in the same direction as the direction of an external force, and the valve further includes a driving unit which reversibly controls the opening and closing of the flow channel caused by the blocking member by fixing the pressing member to the position of the moved pressing member or returning to the original position.

9 Claims, 6 Drawing Sheets

(52) U.S. Cl.
CPC ...... *F16K 99/0034* (2013.01); *F16K 99/0042* (2013.01); *B01L 2200/143* (2013.01); *B01L 2300/0803* (2013.01); *B01L 2300/123* (2013.01); *B01L 2400/0409* (2013.01); *B01L 2400/0655* (2013.01); *F16K 2099/0071* (2013.01); *F16K 2099/0084* (2013.01)

(58) Field of Classification Search
CPC ....... B01L 2400/0655; B01L 3/502738; F16K 2099/0071; F16K 2099/0084; F16K 99/0026; F16K 99/0034
See application file for complete search history.

(56) References Cited

FOREIGN PATENT DOCUMENTS

| | | |
|---|---|---|
| JP | 2003-340797 | 12/2003 |
| JP | 2005-176836 | 7/2005 |
| JP | 2005-308200 | 11/2005 |
| JP | 2007-085537 | 4/2007 |
| JP | 2008-537063 | 9/2008 |
| JP | 2013-015134 | 1/2013 |
| KR | 10-0851980 | 8/2008 |
| KR | 10-0978682 | 8/2010 |
| KR | 10-1347373 | 1/2014 |
| KR | 10-2014-0072706 | 6/2014 |

OTHER PUBLICATIONS

Translation of JP 2013-015134 detail description (Year: 2013).*
K. W. Oh; C. H. Ahn, "A review of microvalves", Journal of Micromechanics and Microengineering, vol. 16, pp. R13, Mar. 24, 2006.
M. Madou; J. Zoval; G. Jia; H. Kido; J. Kim; N. Kim, "Lab on a CD", Annu. Rev. Biomed. Eng., vol. 8, pp. 601-628, May 2, 2006.

* cited by examiner

MICROFLUIDIC DEVICE AND CONTROL EQUIPMENT FOR MICROFLUIDIC DEVICE

FIELD OF THE INVENTION

The present invention relates to a microfluidic device and a control equipment for the microfluidic device to control a fluid flow.

DESCRIPTION OF THE RELATED ART

In general, a microfluidic device performs a number of specified functions by controlling a fluid flow through a valve installed between the plurality of chambers containing a small amount of fluid.

The valve is one of the most important elements for fluid control in research which uses a microfluidic. Optionally, the fluid can be transported and stored through the operation of the valve, thus it is possible to integrate a number of functions on a single chip. Therefore, various kinds of valves technologies utilizing pneumatic, magnetic force, wax, or the likes have been developed to control the microfluidic.

Typically, a capillary valve using a capillary force generated while the fluid passes in the disc and a balance of the centrifugal force is used as a valve structure. Although the capillary valve is easy to prepare and use since it uses only the structure of the disc, a local fluid flow control is impossible because the opening and closing of the valve is adjusted by only the disc rotation. Furthermore, the fluid cannot be reused after flowing once.

To overcome these disadvantages, a valve which opens the channel by selectively dissolving and recystallizing the wax in which the magnetic bead is dispersed through a laser was developed. The valve using the wax can easily store the reagent since the local and selective microfluidic control is available and the flow of steam can be blocked. However, the external energy sources such as a laser is needed to operate the valve, and reversible use is impossible. Above all, since the valve using the wax is weak in the high temperature, it is difficult to use for the integration of the reaction accompanying the heat such as molecular diagnosis.

Moreover, to overcome the disadvantages of the valves using the wax, a valve which can control the flow of the microfluidic on the disc by using a material having elasticity is being developed, but this structure also has the disadvantage that the user has to manually operate the pressing member to open or close the valve.

As the mentioned above, the valves according to the conventional techniques have the large or small disadvantages to the operation or control, and these disadvantages are big problem on the development of the field diagnostic device which requires the whole process automation from the injection of the sample to the detection of the results. Thus, the improved structure of the valve is required in the microfluidic device.

CONTENTS OF THE INVENTION

Problem to be Solved

A microfluidic device and a control equipment for the microfluidic device to easily operate a valve for controlling a fluid flow are provided.

Further, a microfluidic device and a control equipment for the microfluidic device to make the operation of the valve to be machined are provided.

Means for Solving Problem

A microfluidic device in this embodiment may comprise: a platform having a plurality of chambers; at least one flow channel which connects between the chambers; and a valve which opens or closes the flow channel.

The valve includes a blocking member which selectively blocks the flow channel and a pressing member installed in the blocking member to move the blocking member, and the pressing member has a structure which presses and moves the blocking member by the linear reciprocating motion in the same direction as the direction of an external force, and the valve further includes a driving unit which reversibly controls the opening and closing of the flow channel caused by the blocking member by fixing the pressing member to the position of the moved pressing member or returning to the original position.

The pressing member may have a structure whose position is switched to any one of the first position for blocking the flow channel or the second position for opening the flow channel.

The driving unit may have a structure which selectively positions the pressing member to any one of the first position for blocking the flow channel or the second position for opening the flow channel.

The blocking member may have a structure made of a material having elasticity, and which opens and closes the flow channel by being pressed and transformed by the pressing member.

The blocking member may include at least one selected from polydimethylsiloxane (PDMS), polybutadiene, butyl, polyisoprene, chloroprene, elastic synthetic resin, rubber, and silicon.

The blocking member may have a structure which blocks the flow channel by being elastically transformed when the pressing member moves to the first position.

The driving unit may include a fixing unit to fix the position of the pressing member moved to the first position or the second position by an external force, and a returning unit to move the pressing member to the original position.

The fixing unit may include a housing located outside of the blocking member, in which the pressing member is installed to be movable; a push bar connected to the outer front end of the pressing member and extended to the outside of the housing, in which the external force is applied; a first hole and a second hole formed at a distance to the housing along the direction of movement of the pressing member, which define the first position or second position; an elastic bar installed in the push bar to be elastically deformable; and a projection protruded to the elastic bar, which is selectively hung at the first hole or the second hole.

The projection may have a structure whose at least one side is an inclined surface along the direction of movement of the pressing member.

The push bar may have a marker according to a push position in an outside surface.

The returning unit may include the elastic member installed between the housing and the push bar in the housing, which applies the elastic force to the push bar.

The returning unit may have a structure which moves the pressing member by applying the elastic force generated by being pressed and transformed by the pressing member in the blocking member to the pressing member.

The fixing unit may include a support tank located outside of the blocking member, in which the pressing member is installed to be movable; a rotation tank connected to the outer front end of the pressing member and installed in the support tank to be rotatable; a push bar installed by surrounding the outer front end of the rotation tank, in which an external force is applied by being extended to the outside of the support tank; a peg protruded at a distance along the outer peripheral surface of the rotation tank; a first locking groove and a second locking groove which define the first position and the second position by being arranged alternately along the inner peripheral surface of the support tank and by being formed at a distance along the direction of movement of the pressing member, in which the peg is selectively hung; an inclined plane moving member connected with the upper end of the peg by being formed along the inner front end of the push bar, which makes an inclined surface between the first locking groove and the second locking groove to alternately move the peg to the first looking groove and the second locking groove along the inclined surface when the push bar is pressed by the external force.

The push bar may have a marker according to a push position in the outside surface.

The returning unit may include the elastic member installed between the support tank and the rot at ion tank in the support tank, which applies the elastic force to the rotation tank.

The returning unit may have a structure which moves the rotation tank by applying the elastic force generated by being pressed and transformed by the pressing member in the blocking member to the pressing member.

A control equipment in this embodiment may include a control operation unit to open or close at least any one of a plurality of valves installed in the microfluidic device.

The control operation unit may include a driving button which applies an external force to the pressing member of the valve; a vertical moving unit arranged in a vertical direction against the platform, which moves up and down the driving button against the platform; a horizontal moving unit arranged in a horizontal direction toward the center of the platform, which horizontally moves the vertical moving unit; and a controller which controls the vertical moving unit and the horizontal moving unit, and which moves the driving button on the valve.

The control operation unit may have a structure which moves a valve selected from valves provided in the platform to the position of the driving button by connecting the controller to a rotation axis of the platform and by controlling the amount of rotation of the platform through a motor for rotating the platform.

The control operation unit may further include a return button provided in the vertical moving unit to separate the projection from the first hole or the second hole by pushing the return button.

Effects of the Invention

The microfluidic device in this embodiment can be more easily operated through a single pressing operation as a one-touch type since the operability of a valve which controls the flow of fluid is improved.

In addition, the automation of the device can be achieved by making the operation of the valve to be mechanized. Thus, the present invent ion can enhance the usability in many areas such as a field diagnostic device which requires the automation or the likes.

DETAILED DESCRIPTION

The terminology used below are merely to refer to a particular embodiment and are not intended to limit the present invention. As used herein, the singular forms also include the plural forms unless the context clearly indicates otherwise. The meaning of "comprising" or "including" as used in the specification embodies specific characteristics, regions, integers, steps, operations, elements, and/or components, and it does not exclude the presence or addition of other characteristics, regions, integers, steps, operations, elements, components, and/or groups.

Hereinafter, with reference to the attached drawings, embodiments of the present invention will be described so that a person ordinarily skilled in the art can readily conduct. As can be readily appreciated by the person ordinarily skilled in the art, embodiments described below can be modified in various forms to the extent not departing from the spirit and scope of the invention. Thus, the present invention can be implemented in many different forms and should not be limited to the embodiments set forth herein.

Figure 1:
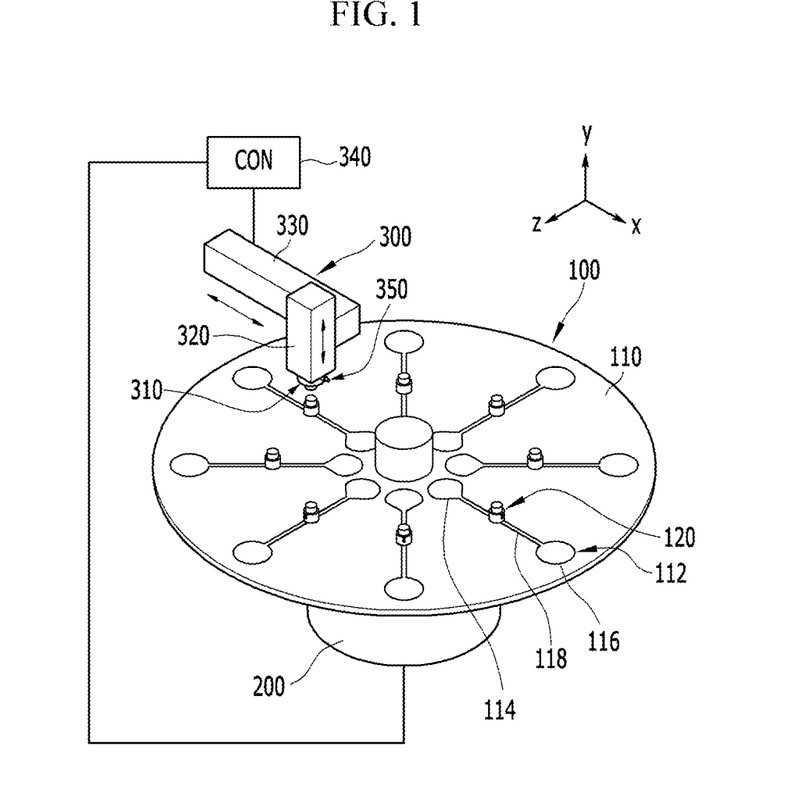
FIG. 1 is a schematic configuration of the microfluidic device and the control equipment according to the present embodiment.
Figure 2:
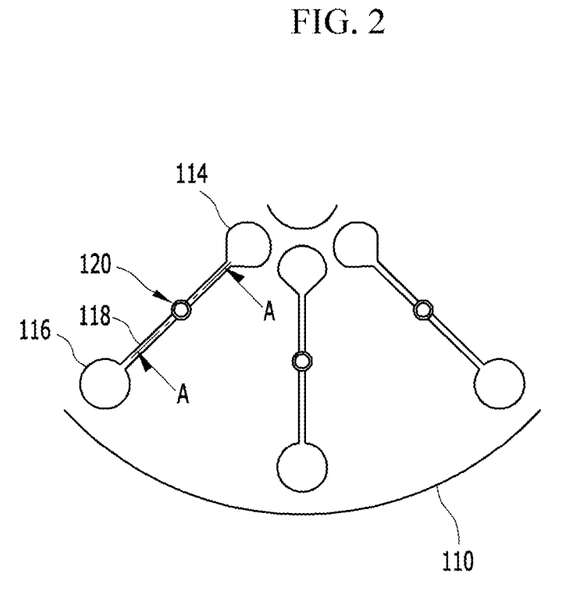
FIG. 2 is a plan view of the microfluidic device according to the present embodiment.

FIG. 1 and FIG. 2 shows the microfluidic device and the control equipment according to the embodiment of the present invention.

The microfluidic device (100) in the present embodiment comprises: a platform (110) having a plurality of chambers (114, 116); a plurality of flow channels (118) which connect between the chambers (114, 116); a valve (120) which selectively communicates between the chambers (114, 116) by opening or closing the each flow channel (118).

The microfluidic device (100), for example, may be used to analyze the sample by being attached to the analysis system. The analysis system may have a motor (20) for rotating the platform of the microfluidic device, a light source which irradiates the light to the microfluidic device for analysis, and a spectroscope which analyzes the light passed through the microfluidic device. The analysis system detects ingredients according to the color of the sample changed by the reagent by using the light source and the spectroscope. According to the color of the analyte, a different wavelength appears in the spectroscope, and it is possible to detect the analyte by the detected wavelength. In addition, if the concentration of analyte is high, the absorbance also increases in proportion to that. Thus, the concentration of the analyte can be detected based on the absorbance measured at the spectroscope. The analysis system may further include a camera and a strobe light for monitoring. The analysis system may be modified as a variety of configurations depending on the structure of the microfluidic device or the analyte, and it is not particularly limited.

Figure 3:
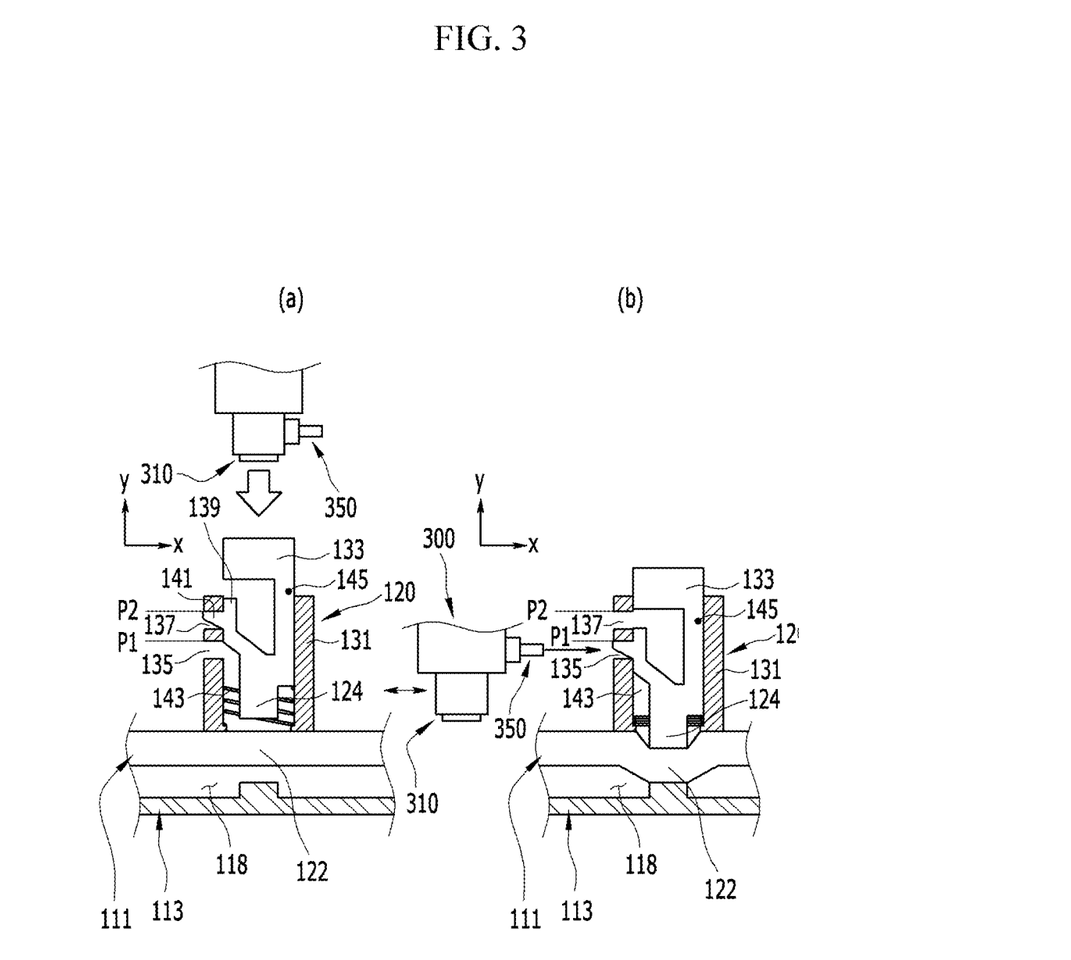
FIG. 3 is a schematic view for explaining the valve structure of the microfluidic device and the operation of the valve according to the present embodiment.

The platform (110) has a center of rotation, for example, it may be formed of a rotatable circular plate. The platform (110) may be formed by attaching two substrates to form the chamber (114, 116) and the flow channel (118). For convenience, hereinafter, as shown in FIG. 3, a substrate relatively disposed in the upper position along the y-axis direction is referred to the first substrate (111), and a substrate relatively disposed in the lower position is referred to the second substrate (113). In this embodiment, the chamber (114, 116) which stores a concave-shaped fluid and the flow channel (118) which connects the chambers are formed inside the second substrate (113). The first substrate (111) blocks the open top of the chamber (114) and the flow channel (118) by being joined to the second substrate (113). Of course, as opposed to the structure stated above, the chamber and the flow channel may be formed on the first substrate, and it is not particularly limited. The first substrate (111) and the second substrate (113) form the platform (110) by being joined by various ways such as an adhesion by using an adhesive, an ultrasonic welding, a laser welding, or the likes. Moreover, the platform (110) may be formed of a material having chemical and biological stability, and optical transparency.

In this embodiment, the first substrate (111) may be elastically deformed, so it can act as the blocking member to block the flow channel (118) (see 122 in FIG. 3). As it will be described in detail later.

The platform (110) is divided into a plurality of areas, and each area may have the microfluidic structure (112) which is independently operated for each areal. Accordingly, since the platform (110) has the plurality of microfluidic structures (112), a plurality of samples can be analyzed by using one platform (110).

The microfluidic structure (112) includes the chamber (114) for the sample injection and the chamber (116) for the sample analysis. Each of the chambers (114, 116) are connected via the flow channel (118), and a valve (120) which opens or closes the flow channel (118) is installed in the flow channel (118).

The chamber (114) for the sample injection is a chamber in the closest position to the center of rotation of the platform (110). The chamber (116) for analysis is disposed further away from the center of rotation of the platform (110) than the chamber (114) for the sample injection. The sample as the analyte can be injected into the chamber (114) for the sample injection, and the reagent for sample analysis can be injected into the chamber (116) for analysis.

When the platform (110) is rotated, the sample stored in the chamber (114) can be moved into the chamber (116) connected to the flow channel by the centrifugal force. The valve (120) installed between the chamber (114) and the chamber (116) controls the movement of the sample.

As described in FIG. 1, the control equipment which controls and drives the microfluidic device (100) comprises a control operation unit (300) disposed outside the microfluidic device (100), which opens and closes at least any one of a plurality of valves installed in the platform (110).

In this embodiment, the control operation unit (300) includes: a driving button (310) which applies an external force to the valve (120); a vertical moving unit (320) arranged in a vertical direction against the platform (110), which moves up and down the driving button (310) against the platform (110); a horizontal moving unit (330) arranged in a horizontal direction toward the center of the platform (110), which horizontally moves the vertical moving unit (320); and a controller (340) which controls the vertical moving unit (320) and the horizontal moving unit (330), and which moves the driving button (310) on the valve (120).

Furthermore, the control operation unit (300) may have a structure which moves a valve (120) selected from a plurality of valves (120) provided in the platform (110) to the position of the driving button (310) by connecting the controller (340) to a rotation axis of the platform (110) and by controlling the amount of rotation of the platform (110) through a motor (200) for rotating the platform (110).

The vertical moving unit (320) moves the driving button (310) along the y-axis direction against the platform (110) in FIG. 1. The horizontal moving unit (330) moves the driving button (310) along the x-axis direction in FIG. 1. The vertical moving unit (320) and the horizontal moving unit (330), for example, may be a rail moving structure which uses a movable rail and a linear motor. Any structure which can move the driving button (310) along the Cartesian coordinate system is applicable to the vertical moving unit (320) and the horizontal moving unit (330).

The motor (200) moves the position of the valve (120) on the xz plane in FIG. 1 by rotating the platform (110). As a result, the motor (200) can move the driving button (310) against the valve (120) in the x-axis and y-axis, and can move the valve (120) against the driving button (310) in the z-axis. Thus, it seems as if the driving button (310) is moved at three-axis, so the driving button (310) can be accurately positioned on the valve (120) that is intended to control.

The driving button (310) is to pressure by pressing the push bar (see FIG. 3 and FIG. 4) located in the valve (120), and it may be a structure that can move the push bar in a linear direction by moving forward and backward in the same manner as the drive cylinder.

Accordingly, the driving button (310) is moved to the desired position by the control operation of the controller (340), thus the valve (120) can be mechanically operated.

FIG. 3, as A-A line cross-sectional view of FIG. 2, describes a structure of the valve according to this embodiment. Hereinafter, the valve is described by referring to FIG. 3.

The valve (120) includes: a blocking member (122) which selectively blocks the flow channel (118); a pressing member (124) installed in the blocking member (122), which moves the blocking member (122); and a driving unit which fixes the pressing member (124) to the position of the moved pressing member or returns to the original position.

The blocking member (122) is a structure which opens and closes the flow channel (118) by being pressed and elastically deformed by the pressing member (124) or being returned to the original state. Hereinafter, in the present embodiment, as shown in FIG. 3, described is a structure which opens the flow channel (118) by blocking the flow channel (118) and returning to the original state when the blocking member (122) is elastically deformed by being pressed by the pressing member (124).

The blocking member (122) may be formed of a material having elasticity to be elastically deformed by itself.

For example, the blocking member (122) may be formed of elastic synthetic resin such as polydimethylsiloxane (PDMS), polybutadiene, butyl, polyisoprene, chloroprene, or at least one material selected from rubber or silicon.

In this embodiment, the blocking member (122) may be made of the first substrate (111) or may be integrally formed on the first substrate (111). In addition to these structures, the blocking member (122) can be installed in only the portion of the flow channel (118) of the first substrate (111).

The blocking member (122) blocks the flow channel (118) by elastically deforming the pressing member (124) since the pressing member is moved and pressed by the external force. Then, when the pressing member (124) is returned to the original position, the blocking member (122) opens the flow channel (118) that is blocked by recovering its original state by its own elastic restoring force. The position in which the pressing member (124) presses and elastically deforms the blocking member (122) to be close the flow channel (118) is referred to as the first position (P1), and the original position in which the pressing member (124) is returned is referred to as the second position (P2).

Thus, in this embodiment, the blocking member (122) blocks the flow channel (118) by being elastically deformed when the pressing member (124) moves to the first position (P1).

The pressing member (124) that is a bar-shaped structure having a predetermined length. The pressing member (124) is located on the blocking member (122) and moves along the up-and-down direction (y-axis direction in FIG. 3), as a result, the blocking member (122) is pressurized and deformed.

In this embodiment, the pressing member (124) is a structure which presses and moves the blocking member (122) by the linear reciprocating motion in the same direction as the direction of an external force. The pressing member (124) may be switched to any one of the first position (P1) for blocking the flow channel (118) or the second position (P2) for opening the flow channel (118). Thus, the external force for operating the valve (120) is transmitted serially to the blocking member (122) through the pressing member (124), so the flow channel (118) may be more easily opened and closed. In addition, since the operability of the valve (120) is improved, the flow channel (118) may be more easily opened or closed by a single pressing operation as a one-touch type.

The driving unit reversibly controls the opening and closing of the flow channel (118) caused by the blocking member (122) by fixing the pressing member (124) to the first position (P1) or by returning to the second position (P2) as the original position. The pressing member (124) is selectively located at any one of the first position (P1) or the second position (P2) by the driving unit.

For this purpose, the driving unit includes a fixing unit to fix the position of the pressing member (124) moved to the first position (P1) or the second position (P2) by an external force, and a returning unit to move the pressing member (124) to the original position.

As described in FIG. 3, the fixing unit includes: a housing (131) located outside of the blocking member (122), in which the pressing member (124) is installed to be movable; a push bar (133) connected to the outer front end of the pressing member (124) and extended to the outside of the housing (131), in which the external force is applied; a first hole (135) and a second hole (137) formed at a distance to the housing (131) along the direction of movement of the pressing member (124), which define the first position (P1) or the second position (P2); an elastic bar (139) installed in the push bar (133) to be elastically deformable; and a projection (141) protruded to the elastic bar (139), which is selectively hung at the first hole (135) or the second hole (137).

In this embodiment, the returning unit includes the elastic member (143) installed between the housing (131) and the push bar (133) in the housing (131), which applies the elastic force to the push bar (133). The elastic member (143) may be, for example, an elastic spring. In addition to the above described structure, the returning unit may be a structure which moves the pressing member (124) by applying the elastic force of the blocking member (122) to the pressing member (124) while being pressed and deformed by the pressing member (124) without having a separate elastic member.

The housing (131) may be formed of a cylindrical shape whose both ends are opened. The housing (131) is disposed above the blocking member (122) and may be connected to the blocking member (122). The pressing member (124) elastically deforms the blocking member (122) by being moved through the open lower end of the housing (131). The push bar (133) is connected to the upper end of the pressing member (124) and is installed so as to project upwardly through the open top end of the housing (131). The push bar (133) is a member connected with the external force, and it directly transfers the external force to the pressing member (124) since it is directly connected to the pressing member (124). When the push bar (133) is pressed by the external force, the pressing member (124) linearly moves as the direction of the external force in the housing (131), as a result the blocking member (122) is pressurized and deformed.

The push bar (133) enters into the housing (131) by being pressed by the external force. The projected height of the push bar (133) against the housing (131) varies depending on the position of the pressing member (124). Thus, the opening and closing state of the valve (120) can be easily confirmed in the outside through the projected height of the push bar (133) against the housing (131). To more easily determine the opening and closing state of the valve (120), in this embodiment, the push bar (133) further has a marker (145) according to a push position in an outside surface. The forming position of the marker (145) is hidden by the housing (131) when the push bar is pressed into the housing (131), on the other hands, the forming position of the marker (145) can be formed at the position exposed to the outside when the push bar (133) is returned to the original position. That is, the marker (145) is hidden by the housing (131) in the state in which the pressing member (124) is moved to the first position (P1) as a flow channel (118) blocking position, on the contrary, when the pressing member (124) is moved to the second position (P2) as a flow channel (118) opening position, the marker (145) can be formed at the position exposed to the outside of the housing (131).

The first hole (135) and the second hole (137) are formed at a distance along the y-axis direction on the side of the housing (131). The first hole (135) and the second hole (137) are formed along the same line along y-axis. The distance between the first hole (135) and the second hole (137) defines the first position (P1) and the second position (P2) that is the range of movement of the pressing member (124).

The elastic bar (139) has a structure of a bar or rib extending longitudinally toward the top from the pressing member (124) so as to have the elastic force itself. The elastic bar (139) is formed to apply the elastic force toward the inner circumferential surface of the housing (131). The projection (141) is formed at the one side of the elastic bar (139) as the position according to the first hole (135) based on the when the pressing member (124) is pressed and reached to the first position (P1). Thus, when the pressing member (124) is moved to the first position (P1), the blocking member (122) is elastically deformed to block the flow channel (118). In addition, the projection (141) formed at the elastic bar (139) is fitted to the first hole (135) to fix the pressing member (124) to the second position (P2) against the housing (131). In this process, the elastic member (143) installed between the push bar (133) and the housing (131) is compressed, and the return force necessary to return the pressing member (124) to the original position is provided.

In this embodiment, the projection (141) has a structure having the inclined surface in which the surface facing the second hole (137) is inclined at certain angle against the movement direction so that the projection (141) passes thorough between the first hole (135) and the second hole (137) during the movement of the pressing member (124). Thus, the projection (141) is pushed into the housing (131) and spaced apart from the first hole (135) while the projection (141) is faced with the inclined surface and the first hole (135) when the projection (141) is out of the first hole (135) according to the movement of the pressing member (124). In this process, as the elastic bar (139) with the projection (141) is elastically and inwardly bent, the elastic returning force is generated. If the pressing member (124) is fully reached to the second position (P2), the projection (141) is also reached to the position of the second hole (137). As a result, the elastic bar (139) that is flexibly bent is returned to its original position by the elastic returning force. Thus, the projection (141) is fitted to the second hole (137). The projection (141) remains the state in which the projection (141) is fitted to the second hole (137) of the housing (131) by the elastic force of the elastic bar (139). Thus, the pressing member (124) is fixed to the second position (P2), and the blocking member (122) blocks the flow channel (118) by being pressed by the pressing member (124).

In this state, the pressing member (124) need to be returned to the second position (P2) as the original position to open and operate the flow channel (118). Once the projection (141) hooked to the first hole (135) is separated from the first hole (135) by the external force, the fixed pressing member is released. As a result, the pressing member (124) moves up by the elastic force of the elastic member (143) compressed by the pressing member (124). Once the pressing member (124) moves up and is reached to the second position (P2), the projection (141) is fitted and hooked to the second hole (137) by the elastic force of the elastic bar (139). When the pressing member (124) is moved to the second position (P2) as the original position, the pressing state of the blocking member (122) is released, and the elastically deformed blocking member (122) is returned to the original state. As a result, the flow channel (118) is opened.

Here, the external force which separates the projection (141) from the first hole (135) by pressing the projection (141) can be obtained by the control operation unit (300) of this embodiment. For this, the control operation unit (300) is provided with the vertical moving unit (320), and it has the return button (350) to separate the projection (141) from the first hole (135).

The return button (350) is installed so as to be driven in the x-axis direction. Thus, the control operation unit (300) is operated so as to position the return button (350) to the first hole (135). Moreover, the projection (141) hung to the first hole (135) can be easily separated from the first hole (135) by driving the return button (350).

Figure 4:
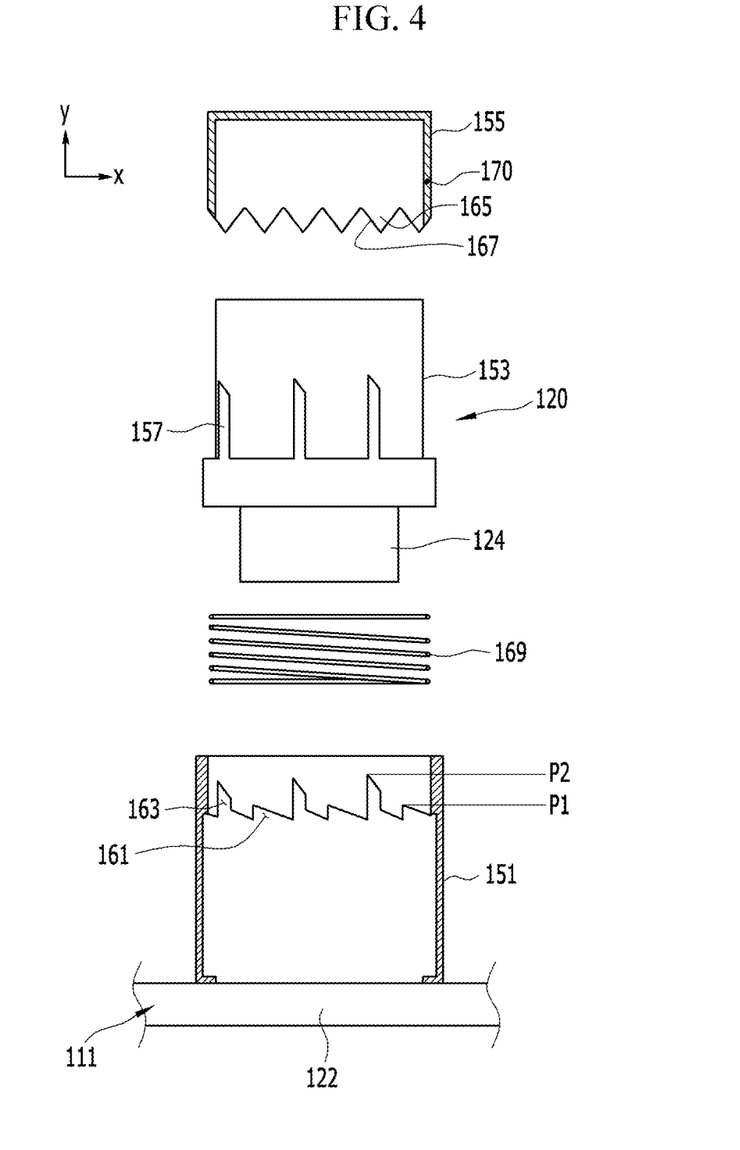
FIG. 4 is a schematic exploded view indicating the valve structure of the microfluidic device according to another embodiment.
Figure 5:
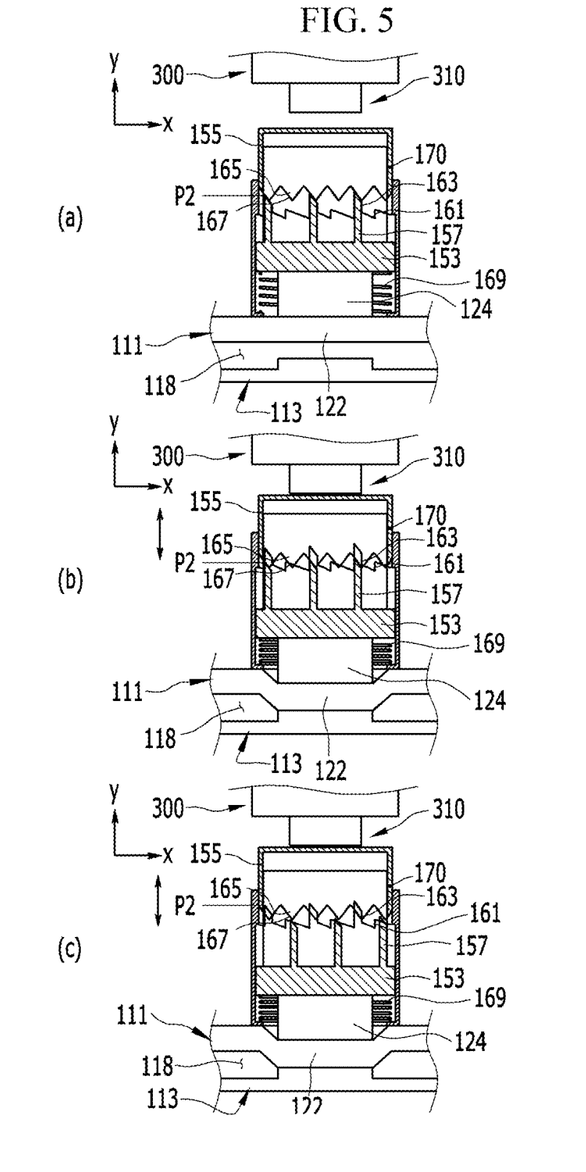
FIG. 5 is a schematic view for explain the operation of the valve according to the embodiment of FIG. 4.

FIG. 4 and FIG. 5 show another embodiment of the valve.

In the valve (120) of this embodiment, other configuration parts except for the structure of the driving unit are the same as the structure mentioned above. Hereinafter, the same reference numerals will be used for the same components, and their detailed description will be omitted.

The valve (120) includes: a blocking member (122) which selectively blocks the flow channel (118); a pressing member (124) installed in the blocking member (122), which moves the blocking member (122); and a driving unit which fixes the pressing member (124) to the position of the moved pressing member or returns to the original position.

The driving unit reversibly controls the opening and closing of the flow channel (118) caused by the blocking member (122) by fixing the pressing member (124) to the first position (P1) or by returning to the second position (P2) as the original position. The pressing member (124) is selectively located at any one of the first position (P1) or the second position (P2) by the driving unit.

For this purpose, the driving unit includes a fixing unit to fix the position of the pressing member (124) moved to the first position (P1) or the second position (P2) by an external force, and a returning unit to move the pressing member (124) to the original position.

As described in FIG. 4, the fixing unit includes: a support tank (151) located outside of the blocking member (122), in which the pressing member (124) is installed to be movable; a rotation tank (153) connected to the outer front end of the pressing member (124) and installed in the support tank (151) to be rotatable; a push bar (155) installed by surrounding the outer front end of the rotation tank (153), in which an external force is applied by being extended to the outside of the support tank (151); a peg (157) protruded at a distance along the outer peripheral surface of the rotation tank (153); a first locking groove (161) and a second locking groove (163) which define the first position (P1) and the second position (P2) by being arranged alternately along the inner peripheral surface of the support tank (151) and by being formed at a distance along the direction of movement of the pressing member (124), in which the peg (157) is selectively hung; an inclined plane moving member (165) connected with the upper end of the peg (157) by being formed along the inner front end of the push bar (155), which makes an inclined surface between the first locking groove (161) and the second locking groove (163) to alternately move the peg (157) to the first looking groove (161) and the second locking groove (163) along the inclined surface (167) when the push bar (155) is pressed by the external force.

In this embodiment, the returning unit may include the elastic member (169) installed between the lower end of the support tank (151) and the rotation tank (153) in the support tank (151), which applies the elastic force to the rotation tank (153). The elastic member (169) may be, for example, an elastic spring. In addition to the above described structure, the returning unit may be a structure which moves the rotation tank (153) by applying the elastic force of the blocking member (122) to the pressing member (124) while being pressed and deformed by the pressing member (124) without having a separate elastic member.

The support tank (151) may be formed of a cylindrical shape whose both ends are opened. The support tank (151) is disposed above the blocking member (122), and it may be connected to the blocking member (122). The support tank (151) elastically deforms the blocking member (122) by being moved through the open lower end of the support tank (151). The push bar (155) is connected to the upper end of the rotation tank (153) and is installed so as to project upwardly through the open top end of the support tank (151). The push bar (155) is a member connected with the external force, and it directly transfers the external force to the pressing member (124) since it is directly connected to the pressing member (124). When the push bar (155) is pressed by the external force, the pressing member (124) linearly moves as the direction of the external force in the support tank (151), as a result the blocking member (122) is pressurized and deformed.

The push bar (155) enters into the support tank (151) by being pressed by the external force. The projected height of the push bar (155) against the support tank (151) varies depending on the position of the pressing member (124). Thus, the opening and closing state of the valve (120) can be easily confirmed in the outside through the projected height of the push bar (155) against the support tank (151). To more easily determine the opening and closing state of the valve (120), in this embodiment, the push bar (155) may further have a marker according to a push position in an outside surface. The forming position of the marker is hidden by the support tank (151) when the push bar (155) is pressed into the support tank (151), on the other hands, the forming position of the marker can be formed at the position exposed to the outside when the push bar (155) is returned to the original position. That is, the marker is hidden by the support tank (151) in the state in which the pressing member (124) is moved to the first position (P1) as a flow channel (118) blocking position, on the contrary, when the pressing member (124) is moved to the second position (P2) as a flow channel (118) opening position, the marker can be formed at the position exposed to the outside of the support tank (151).

In the inner peripheral surface of the support tank (151), the first locking groove (161) and the second locking groove (163) are formed alternately at a distance. The first locking groove (161) and the second locking groove (163) are a structure in which the peg (157) formed in the outer circumferential surface is fitted. Moreover, the lower end of the first locking groove (161) and the second locking groove (163) are open to make the peg (157) to be inserted therein, and the upper end are closed to make the peg (157) to be hung.

The rotation tank (153) is formed of a cylindrical shape and is rotatably installed in the support tank (151). In the outer circumferential surface of the rotation tank (153), the peg (157) fitted into the first locking groove (161) or the second locking groove (163) is protrudingly formed.

The push bar (155) is connected to the upper end of the rotation tank (153). The push bar (155) is formed of a cylindrical shape whose lower end is opened and is fitted and installed to the upper end of the rotation tank (153). The push bar (155) can only move up and down because the rotation is limited against the support tank (151). For this, the push bar (155), for example, may be connected with the support tank (151) as the spline structure. Therefore, the push bar (155) only moves up and down against the fixed support tank (151), and the rotation tank (153) is installed to be rotatable between the support tank (151) and the push bar (155).

In the lower end of the push bar (155), the inclined plane moving member (165) which moves the peg (157) of the rotation tank (153) to the first locking groove (161) or the second locking groove (163) of the support tank (151) when the push bar moves up and down is formed. The inclined plane moving member (165) is continuously formed at distance along the lower end of the push bar (155). The forming distance of the inclined plane moving member (165) is corresponding to the distance between the first locking groove (161) and the second locking groove (163).

In the inclined plane moving member (165), a surface in contact with the peg (157) is the inclined surface (167). Thus, the peg (157) is slid along the inclined surface (167) of the inclined plane moving member (165), and the peg (157) is moved while the rotation tank (153) is rotated. To make the peg (157) to be smoothly slid against the inclined surface (167), the upper end of the peg (157) is also inclined and formed at an angle corresponding to the inclined surface (167) of the inclined plane moving member (165). In addition, the part between the first locking groove (161) and the second locking groove (163) is inclined and formed to make the peg (157) to be easily slid and moved.

The pressing member (124) can be moved to the first position (P1) or the second position (P2) by the organic working relationship of the peg (157), the first locking groove (157), the second locking groove (163), and the inclined plane moving member (165).

That is, the inclined plane moving member (165) is formed so that the inclined surface (167) is placed between the first locking groove (161) and the second locking groove (163). When the inclined plane moving member (165) pushes the peg (157) to the outside of the first locking groove (161) and the second locking groove (163), the peg (157) is moved along the inclined surface (167) between the first locking groove (161) and the second locking groove (163). Thus, the rotation tank (153) having the peg (157) is rotated in one direction in the support tank (151). As a result, the peg (157) is moved from the first locking groove (161) to the second locking groove (163) or from the second locking groove (163) to the first locking groove (161) along the inclined surface (167) of the inclined plane moving member (165).

The height difference between the closed top end of the first locking groove (161) and the second locking groove (163), which is formed at a different height from the bottom end of the support tank (151) along the y-axis direction in FIG. 4, defines the movement range of the pressing member (124). That is, the height difference defines the first position (P1) and the second position (P2).

The closed top end of the first locking groove (161) is formed with a height so that the top end of the peg (157) is hung based on the time when the pressing member (124) is pressed and reached to the first position (P1).

The closed top end of the second locking groove (163) is formed above the first locking groove (161), and it is formed with a height so that the top end of the peg (157) is hung based on the time when the pressing member (124) is reached to the second position (P2) by returning to the original position.

As shown in FIG. 5, when the push bar (155) is pressed by the external force in the state in which the flow channel (118) is opened, the push bar (155) moves linearly. As a result, the inclined plane moving member (165) pressures the top end of the peg (157) placed in the second locking groove (163). The peg (157) is fitted to the second locking groove (163) of the support tank (151) extended up and down, and the peg (157) is pressed down along the second locking groove (163) by the pressing force of the push bar (155), and then the rotation tank (153) having the peg (157) is moved down.

The pressing member (124) disposed in the lower portion of the rotation tank (153) is moved as the rotation tank (153) is moved down. The blocking member (122) is elastically deformed while the pressing member (124) is moved down. In this process, the elastic member (169) installed between the support tank (151) and the rotation tank (153) is compressed, so the elastic force is continuously applied to the rotation tank (153). When the peg (157) is completely off the lower portion of the second locking groove (163) since the push bar (155) pushes the peg (157), the interference between the peg (157) and the second locking groove (163) is released, as a result, the rotation tank (153) is possible to be rotatable. Thus, the peg (157) is slid along the inclined surface (167) of the inclined plane moving member (165) while receiving the elastic force of the elastic member (169), as a result, the rotation tank (153) is rotated against the support tank (151).

When the rotation tank (153) is rotated, the peg (157) formed at the rotation tank (153) is moved along the inclined surface (167) of the inclined plane moving member (165), as a result, the position of the peg (157) is moved from the second locking groove (163) to the first locking groove (161).

When the peg (157) is reached to the first locking groove (161), the pressing member (124) pressed by the rotation tank (153) is reached to the first position (P1). When the pressing member (124) is reached to the first position (P1), the blocking member (122) is elastically deformed by the pressing member (124) and blocks the flow channel (118). In addition, the peg (157) is fitted to the first blocking groove (161) and fixes the pressing member (124) to the first position (P1) against the support tank (151).

In this state, the pressing member (124) is returned to the second position (P2) as the original position to open and operate the flow channel (118). For this, the valve (120) in this embodiment as a one-touch type can open the flow channel (118) once only the push bar (155) is pressed because the pressing member (124) is returned to its original position.

That is, when the push bar (155) is pressed by the external force, the push bar (155) moves linearly. As a result, the inclined plane moving member (165) formed at the lower portion of the push bar (155) pressures the top end of the peg (157) placed in the first locking groove (161). The peg (157) is fitted to the first locking groove (161) of the support tank (151) extended up and down, and the peg (157) is pressed down along the first locking groove (161) by the pressing force of the push bar (155), and then the rotation tank (153) having the peg (157) is moved down.

When the peg (157) is completely off the lower portion of the first locking groove (161) since the push bar (155) pushes the peg (157), the interference between the peg (157) and the first locking groove (161) is released, as a result, the rotation tank (153) is possible to be rotatable. Thus, the peg (157) is slid along the inclined surface (167) of the inclined plane moving member (165) while receiving the elastic force of the elastic member (169), as a result, the rotation tank (153) is rotated against the support tank (151). When the rotation tank (153) is rotated, the peg (157) formed at the rotation tank (153) is moved along the inclined surface (167) of the inclined plane moving member (165), as a result, the position of the peg (157) is moved from the first locking groove (161) to the second locking groove (163).

When the peg (157) is moved to the second locking groove (163), the rotation tank (153) which receives the elastic force of the elastic member (169) is raised up until the peg (157) is hung to the top end of the second locking groove (163). The pressing member (124) pressed by the rotation tank (153) is moved up as the rotation tank (153) is raised up. When the peg (157) is hung to the top end of the second locking groove (163) by being moved along the second locking groove (163), the pressing member (124) also is moved up and reached to the second position (P2), as a result, the movement of the pressing member (124) is stopped. When the pressing member (124) is moved to the second position as its original position, the pressing state of the blocking member (122) is released, as a result, the flow channel (118) is opened since the blocking member (122) that is elastically deformed is returned to the original state.

Thus, it is easy to open the flow channel (118) by easily driving the valve (120) through the one push operation.

Figure 6:
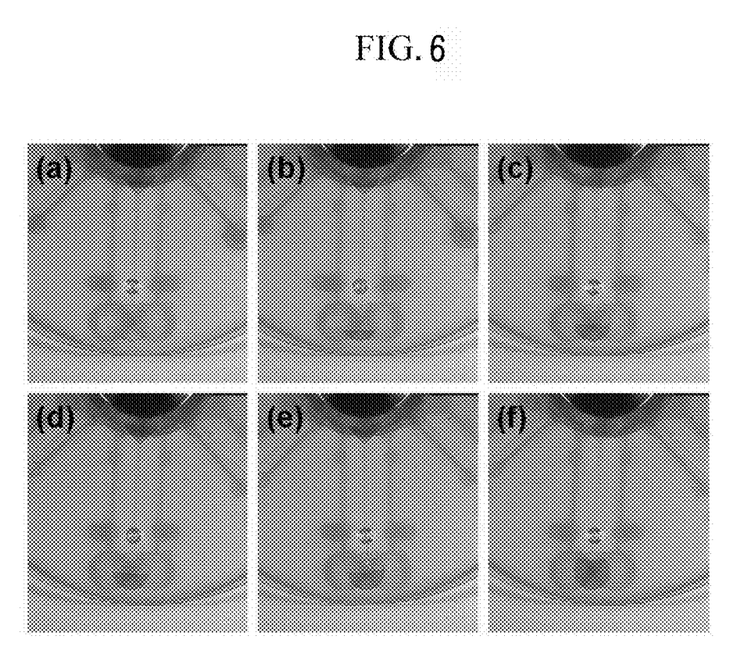
FIG. 6 is a photo indicating the fluid flow of the microfluidic device according to the present embodiment.

FIG. 6 is a photo showing the fluid flow in the microfluidic device (100) prepared according to this embodiment. When it is applied the valve (120) of FIG. 3 or the valve (120) of FIG. 5, it was obtained the same result in relatiin to the fluid flow. It is followed the description of the microfluidic device (100) applied the valve (120) of FIG. 5.

In FIGS. 6a and 6b, the valve (120) is closed, and in FIGS. 6b, 6c, 6e, and 6f, the valve (120) is opened.

In the microfluidic device (100), if the platform (110) is rotated after injecting the fluid to the injection chamber (114), the fluid is transported through the flow channel (118) as the microchannel. If the valve is closed, as described in FIG. 6a, the fluid cannot pass through the flow channel (118). Thus, in this embodiment, it can be seen that the flow of the fluid is completely blocked when the valve (120) is closed.

After that, when the valve (120) is operated by the one push pressure generated by operating the driving button (310) of the control operation unit (300) through one-touch manner, the valve (120) is easily switched to the open state from the closed state, and then the flow channel (118) is opened. Thus, as shown in FIGS. 6b and 6c, the fluid flows through the flow channel (118).

While the fluid flows due to opening of the flow channel (118), once again contacting and pressuring the valve (120), the valve (120) is easily closed by the reversible drive. As a result, the flow of the fluid through the flow channel (118) is blocked as shown in FIG. 6d. Once again, when the valve (120) is pressed as the one-touch manner, the valve (120) is easily opened and operated. As a result, as described in FIGS. 6e and 6f, the fluid flows again through the flow channel (118).

As described above, according to this embodiment, the opening and closing of the flow channel (118) can be easily performed since the valve (120) is operated by one contact pressure based on the one-touch manner.

Although the preferred embodiment of the present invention has been described above, the present invention is not limited thereto and can be performed by one of several variations within the claims, the description, and the accompanying drawings. It is also within the scope of the present invention.

[DESCRIPTION OF REFERENCE NUMERALS]

| | |
|---|---|
| 111: first substrate | 112: microfluidic structure |
| 113: second substrate | 114, 116: chamber |
| 118: flow channel | 120: valve |
| 122: blocking member | 124: pressing member |
| 131: housing | 133, 155: push bar |
| 135: first hole | 137: second hole |
| 139: elastic bar | 141: projection |
| 143, 169: elastic member | 145, 170: marker |
| 151: support tank | 153: rotation tank |
| 157: peg | 161: first locking groove |
| 163: second locking groove | 165: inclined plane moving member |
| 167: inclined surface | |

What is claimed is:

1. A microfluidic device comprising:
a platform having a plurality of chambers; at least one flow channel which connects between the chambers; and a valve which opens or closes the flow channel,
wherein the valve includes a blocking member which selectively blocks the flow channel and a pressing member installed in the blocking member to move the blocking member, and
the pressing member has a structure which presses and moves the blocking member by a linear reciprocating motion in a same direction as a direction of an external force, and the valve further includes a driving unit which reversibly controls the opening and closing of the flow channel caused by the blocking member by fixing the pressing member to a position of the moved pressing member or returning to an original position, and the driving unit has a structure which selectively positions the pressing member to any one of a first position for blocking the flow channel or a second position for opening the flow channel, and the driving unit includes a fixing unit to fix the position of the pressing member moved to the first position or the second position by an external force, and a returning unit to move the pressing member to the original position, and the fixing unit includes a housing located outside of the blocking member, in which the pressing member is installed to be movable; a push bar connected to an outer front end of the pressing member and extending outside of the housing, in which the external force is applied; a first hole and a second hole formed on the housing along a direction of movement of the pressing member at a distance from each other, which define the first position or second position; an elastic bar installed in the push bar to be elastically deformable; and a projection protruding from the elastic bar, which is selectively hung at the first hole or the second hole.

2. The microfluidic device of claim 1, wherein the blocking member has a structure made of a material having elasticity, and which opens and closes the flow channel by being pressed and transformed by the pressing member.

3. The microfluidic device of claim 1, wherein the returning unit includes an elastic member installed between the housing and the push bar in the housing, which applies an elastic force to the push bar.

4. The microfluidic device of claim 1, wherein the returning unit has a structure which moves the pressing member by applying an elastic force generated by being pressed and transformed by the pressing member in the blocking member to the pressing member.

5. The microfluidic device of claim 3, wherein the push bar has a marker according to a push position in an outside surface.

6. A microfluidic device comprising a platform having a plurality of chambers; at least one flow channel which connects between the chambers; and a valve which opens or closes the flow channel, wherein the valve includes a blocking member which selectively blocks the flow channel and a pressing member installed in the blocking member to move the blocking member, and the pressing member has a structure which presses and moves the blocking member by a linear reciprocating motion in a same direction as a direction of an external force, and the valve further includes a driving unit which reversibly controls the opening and closing of the flow channel caused by the blocking member by fixing the pressing member to a position of the moved pressing member or returning to an original position, and the driving unit has a structure which selectively positions the pressing member to any one of a first position for blocking the flow channel or a second position for opening the flow channel, and the driving unit includes a fixing unit to fix the position of the pressing member moved to the first position or the second position by an external force, and a returning unit to move the pressing member to the original position, and wherein the fixing unit includes a support tank located outside of the blocking member, in which the pressing member is installed to be movable; a rotation tank connected to the outer front end of the pressing member and installed in the support tank to be rotatable; a push bar installed by surrounding the outer front end of the rotation tank, in which an external force is applied by being extended to the outside of the support tank; a peg protruded at a distance along an outer peripheral surface of the rotation tank; a first locking groove and a second locking groove which define the first position and the second position by being arranged alternately along an inner peripheral surface of the support tank and by being formed at a distance along the direction of movement of the pressing member, in which the peg is selectively hung; an inclined plane moving member connected with an upper end of the peg by being formed along an inner front end of the push bar, which makes an inclined surface between the first locking groove and the second locking groove to alternately move the peg to the first locking groove and the second locking groove along the inclined surface when the push bar is pressed by the external force.

7. The microfluidic device of claim 6, wherein the returning unit includes an elastic member installed between the support tank and the rotation tank in the support tank, which applies an elastic force to the rotation tank.

8. The microfluidic device of claim 6, wherein the returning unit has a structure which moves the rotation tank by applying an elastic force generated by being pressed and transformed by the pressing member in the blocking member to the pressing member.

9. The microfluidic device of claim 7, wherein the push bar has a marker according to a push position in an outside surface.

* * * * *